(12) United States Patent
Dettmering et al.

(10) Patent No.: US 11,486,586 B2
(45) Date of Patent: Nov. 1, 2022

(54) INTEGRATED RECIRCULATION PUMP FOR NON-CONDENSING WATER HEATER

(71) Applicant: Rinnai America Corporation, Peachtree City, GA (US)

(72) Inventors: Matthew Ryan Dettmering, Newnan, GA (US); Jason Siler, Peachtree City, GA (US); Scott Gilman Humphrey, Newnan, GA (US)

(73) Assignee: Rinnai America Corporation, Peachtree City, GA (US)

( * ) Notice: Subject to any disclaimer, the term of this patent is extended or adjusted under 35 U.S.C. 154(b) by 0 days.

(21) Appl. No.: 17/431,307

(22) PCT Filed: Feb. 18, 2020

(86) PCT No.: PCT/US2020/018654
§ 371 (c)(1),
(2) Date: Aug. 16, 2021

(87) PCT Pub. No.: WO2020/168345
PCT Pub. Date: Aug. 20, 2020

(65) Prior Publication Data
US 2022/0042686 A1    Feb. 10, 2022

Related U.S. Application Data

(60) Provisional application No. 62/806,417, filed on Feb. 15, 2019.

(51) Int. Cl.
*F24D 17/00*  (2022.01)
*C02F 1/00*  (2006.01)
(Continued)

(52) U.S. Cl.
CPC .......... *F24D 17/0078* (2013.01); *C02F 1/008* (2013.01); *C02F 1/02* (2013.01);
(Continued)

(58) Field of Classification Search
CPC .................................................. F24D 17/0078
See application file for complete search history.

(56) References Cited

U.S. PATENT DOCUMENTS 4,977,885 A     12/1990  Herweyer et al.
10,612,793 B1 * 4/2020  Kuster ................ F24D 19/1051
(Continued)

FOREIGN PATENT DOCUMENTS

JP    2015-187511 A    10/2015
JP    2018-119764 A    8/2018

OTHER PUBLICATIONS

PCT/US20/18654, International Search Report dated May 7, 2020, 2 pgs.
(Continued)

*Primary Examiner* — Nathaniel Herzfeld
(74) *Attorney, Agent, or Firm* — Meunier Carlin & Curfman LLC

(57) ABSTRACT

A hot water circulation system comprises a water heater having a cold-water inlet and a hot water outlet. A water pump circulates water through the water heater to produce hot water. The hot water is circulated to a thermal bypass valve, which is configured to close when hot water contacts a heat activated seal. A bypass circuit is coupled between the hot water outlet and the cold water inlet of the water heater. The bypass circuit prevents hot water from circulating from the hot water outlet to the cold-water inlet when the thermal bypass valve is open and promotes circulating hot water from the hot water outlet to the cold water inlet when the thermal bypass valve is closed. Upon a temperature sensor sensing hot water entering the cold-water inlet, the water heater turns of the water pump.

20 Claims, 4 Drawing Sheets

(51) Int. Cl.
 *C02F 1/02* (2006.01)
 *F24D 19/10* (2006.01)
(52) U.S. Cl.
 CPC .... *F24D 19/1051* (2013.01); *C02F 2201/005* (2013.01); *C02F 2209/02* (2013.01); *F24D 2220/025* (2013.01); *F24D 2220/0207* (2013.01); *F24D 2220/0271* (2013.01); *F24D 2220/042* (2013.01)

(56) References Cited

U.S. PATENT DOCUMENTS

| | | | |
|---|---|---|---|
| 10,760,823 | B2 | 9/2020 | Knoblett et al. |
| 2009/0180768 | A1* | 7/2009 | Moore ................ F24D 17/0078 392/485 |
| 2009/0211644 | A1* | 8/2009 | Wylie ................ F24D 17/0078 137/2 |
| 2010/0096018 | A1* | 4/2010 | Wylie ................ F24H 1/122 137/2 |
| 2011/0315787 | A1* | 12/2011 | Linton ................ B08B 3/026 239/124 |
| 2015/0184889 | A1 | 7/2015 | Shaffer et al. |
| 2016/0186415 | A1* | 6/2016 | Yuge ................ F24D 17/0026 137/340 |
| 2016/0265810 | A1 | 9/2016 | Humphrey et al. |
| 2019/0353402 | A1* | 11/2019 | Ryoo ................ F24H 1/145 |
| 2020/0277760 | A1 | 9/2020 | Scafe et al. |

OTHER PUBLICATIONS

PCT/US20/18654, Written Opinion of International Searching Authority dated May 7, 2020, 4 pgs.
Rinnai America Corporation "RUR Ultra Series Tankless Water Heater" 6 pages. Video posted Dec. 29, 2014. available on-line: https://www.youtube.com/watch?v=xsmXByR9mU4.

\* cited by examiner

INTEGRATED RECIRCULATION PUMP FOR NON-CONDENSING WATER HEATER

BACKGROUND

The need for heated fluids, and heated water, has long been recognized. Conventionally, water has been heated by heating elements, either electrically or with gas burners, while stored in a tank or reservoir. While effective, energy efficiency and water conservation using a storage tank alone can be poor. As an example, water that is stored in a hot water storage tank is maintained at a desired temperature. Thus, unless the storage tank is well insulated, heat loss through radiation can occur, requiring additional input of energy to maintain the desired temperature. In effect, continual heating of the stored water in the storage tank is required.

Many of the problems with traditional hot water storage tanks have been overcome using tankless water heaters. With the tankless water heater, incoming ground water passes through a component generally known as a heat exchanger and is instantaneously heated by heating elements (or gas burner) within the heat exchanger until the temperature of the water leaving the heat exchanger matches a desired temperature set by a user of the system. With such systems the heat exchanger is typically heated by a large current flow (or Gas/BTU input) which is regulated by an electronic control system. The electronic control system also typically includes a temperature selection device, such as a thermostat, by which the user of the system can select the desired temperature of the water being output from the heat exchanger.

Tankless water heaters are often used in a water circulation network. Users often integrate tankless water heater with a cold-water source and circulation tubing to provide cold and hot water to plumbing fixtures such as sinks and dishwashers, for example. The circulation networks often utilize valves to control the flow of cold and hot water. The circulation networks may include a hot water recirculation line for recirculating hot water with a tankless water heater. A tankless water heater recirculation system may include a pump for recirculating hot water in the recirculation line. The tankless water heater recirculation system may be cycled on and off using a timer. The tankless water heater recirculation system may activate to heat water in the hot water recirculation line and shut off after a preset time to provide an amount of hot water to ensure the hot water recirculation line is charged with hot water.

SUMMARY

A first aspect of the disclosure provides a hot water circulation system comprising a water heater having a cold-water inlet and a hot water outlet. The hot water circulation system comprises a temperature sensor positioned proximate to the cold-water inlet of the water heater and configured to sense a temperature of water flowing in the cold-water inlet of the water heater. The hot water circulation system comprises a hot water supply line fluidically connected to the hot water outlet of the water heater. The hot water circulation system comprises a bypass circuit coupled between the hot water outlet and the cold water inlet of the water heater. The bypass circuit comprising a water flow control unit. The hot water circulation system comprises a water pump comprising a water pump inlet and a water pump outlet. The water pump outlet is fluidically coupled to the cold-water inlet of the water heater. The hot water circulation system comprises a cold-water supply line fluidically coupled to the water pump inlet and comprising a cold-water supply port. The bypass circuit is fluidically coupled to the cold-water supply line and the hot water supply line. The hot water circulation system comprises a controller configured to stop the water pump upon the temperature sensor detecting a predetermined temperature.

In some implementations of the first aspect of the disclosure, the system further comprises a thermal bypass valve fluidically connected to the hot water supply line and the cold-water supply port.

In some implementations of the first aspect of the disclosure, a first pressure drop across the bypass circuit from the hot water supply line to the cold-water supply line is less than a second pressure drop from the hot water supply line to the thermal bypass valve when the thermal bypass valve is open to prevent circulating hot water from the hot water supply line to the cold-water supply line when the thermal bypass valve is open.

In some implementations of the first aspect of the disclosure, the first pressure drop across the bypass circuit from the hot water supply line to the cold-water supply line is greater than a third pressure drop from the hot water supply line to the thermal bypass valve when the thermal bypass valve is closed to promote circulating hot water from the hot water supply line to the cold-water supply line when the thermal bypass valve is closed.

In some implementations of the first aspect of the disclosure, a fourth pressure drop across the bypass circuit from the cold-water supply line to the hot water supply line is less than a fifth pressure drop from the cold-water inlet to the hot water outlet of the water heater to prevent cold water from circulating from the cold-water supply line to the hot water supply line.

In some implementations of the first aspect of the disclosure, the water flow control unit of the bypass circuit comprises a check valve and a flow restrictor.

In some implementations of the first aspect of the disclosure, the water flow control unit of the bypass circuit comprises a solenoid valve configured to be open when the water pump is on and configured to be closed when the water pump is off.

In some implementations of the first aspect of the disclosure, the water flow control unit of the bypass circuit comprises a pipe with a diameter configured to provide the first pressure drop.

In some implementations of the first aspect of the disclosure, the predetermined temperature is a set point of the water heater, a predefined range within the set point temperature, or an increase in the temperature of water flowing in the cold-water inlet of the water heater by a predetermined amount.

In some implementations of the first aspect of the disclosure, the temperature sensor is located in a flow path of the water heater from the cold-water inlet, at the water pump inlet, or at the water pump outlet.

In some implementations of the first aspect of the disclosure, the controller is configured to start the water pump in response to a user instruction or on a periodic or scheduled basis.

A second aspect of the disclosed provides a method of circulating hot water through a system. The method comprises pumping, by a water pump, water through a cold-water inlet of a water heater to produce hot water. The method comprises circulating the hot water from a hot water outlet of the water heater to a thermal bypass valve. The thermal bypass valve is configured to close when hot water contacts a heat activated seal. The method comprises circulating the hot water from the hot water outlet of the water heater through a bypass circuit to the cold-water inlet when the thermal bypass valve is closed. The method comprises sensing a temperature of the water entering the water heater from the cold-water inlet. The method comprises turning off the water pump once the temperature reaches a predetermined temperature.

In some implementations of the second aspect of the disclosure, the bypass circuit is coupled between a hot water supply line fluidically connected to the hot water outlet of the water heater and a cold-water supply line fluidically connected to the cold-water inlet of the water heater.

In some implementations of the second aspect of the disclosure, the cold-water supply line comprises a cold-water supply port, and wherein the thermal bypass valve is connected to the hot water supply line and the cold-water supply port.

In some implementations of the second aspect of the disclosure, a first pressure drop across the bypass circuit from the hot water supply line to the cold-water supply line is less than a second pressure drop from the hot water supply line to the thermal bypass valve when the thermal bypass valve is open to prevent circulating hot water from the hot water supply line to the cold-water supply line when the thermal bypass valve is open.

In some implementations of the second aspect of the disclosure, the first pressure drop across the bypass circuit from the hot water supply line to the cold-water supply line is greater than a third pressure drop from the hot water supply line to the thermal bypass valve when the thermal bypass valve is closed to promote circulating hot water from the hot water supply line to the cold-water supply line when the thermal bypass valve is closed.

In some implementations of the second aspect of the disclosure, a fourth pressure drop across the bypass circuit from the cold-water supply line to the hot water supply line is less than a fifth pressure drop from the cold-water inlet to the hot water outlet of the water heater to prevent cold water from circulating from the cold-water supply line to the hot water supply line.

In some implementations of the second aspect of the disclosure, the bypass circuit comprises a water flow control unit selected from the group consisting of: a check valve and flow restrictor; a solenoid valve configured to be open when the water pump is on and configured to be closed when the water pump is off; and a pipe with a diameter configured to provide the first pressure drop.

In some implementations of the second aspect of the disclosure, the predetermined temperature is a set point of the water heater, a predefined range within the set point temperature, or an increase in the temperature of water flowing in the cold-water inlet of the water heater by a predetermined amount.

In some implementations of the second aspect of the disclosure, the water pump starts pumping water through the cold-water inlet of the water heater in response to a user instruction or on a periodic or scheduled basis.

A third aspect of the disclosure provides a hot water bypass system. The hot water bypass system comprises a primary hot water pipe. The hot water bypass system comprises a bypass circuit where the bypass circuit comprises a water flow control unit, an inlet, and an outlet, where the bypass circuit inlet is fluidically connected to the primary hot water pipe, and the bypass circuit outlet is fluidically connected to a return line. The return line has, an outlet and a cold-water supply port fluidically connected to the return line. The hot water bypass system comprises a water pump where the water pump comprises a water pump inlet, wherein the return line is fluidically connected to the water pump inlet.

In some implementations of the third aspect of the disclosure, the bypass circuit comprises a check valve fluidically connected to the bypass circuit inlet and a flow restrictor fluidically connected to the bypass circuit outlet.

In some implementations of the third aspect of the disclosure, the bypass circuit comprises a solenoid valve configured to be open when the water pump is on and configured to be closed when the water pump is off.

In some implementations of the third aspect of the disclosure, the bypass circuit comprises a pipe with a diameter configured such that a pressure drop across the bypass circuit is greater than a capacity pressure drop and less than a cold-water entry pressure drop.

In some implementations of the third aspect of the disclosure the return line further comprises a recirculation inlet port.

A fourth aspect of the disclosure describes a hot water circulation system comprising a heat engine having a cold-water inlet and a hot water outlet. The hot water circulation system comprises a primary hot water pipe fluidically connected to the heat engine hot water outlet. The hot water circulation system comprises a bypass circuit comprising, a water flow control unit, a bypass circuit inlet, and a bypass circuit outlet where the bypass circuit inlet is fluidically connected to the primary hot water pipe and the bypass circuit outlet is fluidically connected to a return line. The return line has an outlet and a cold-water supply port fluidically connected to the return line. The hot water circulation water pump comprises a water pump inlet and a water pump outlet, wherein the water pump inlet is fluidically coupled to the return line outlet, and wherein the water pump outlet is fluidically connected to the heat engine cold-water inlet.

In some implementations of the fourth aspect of the disclosure, the bypass circuit comprises a check valve fluidically connected to the bypass circuit inlet and a flow restrictor fluidically connected to the bypass circuit outlet.

In some implementations of the fourth aspect of the disclosure, the bypass circuit comprises a solenoid valve configured to be open when the water pump is on and configured to be closed when the water pump is off.

In some implementations of the fourth aspect of the disclosure, the bypass circuit comprises a pipe with a diameter configured such that a pressure drop across the bypass circuit is greater than a capacity pressure drops and less than a cold-water entry pressure drop.

In some implementations of the fourth aspect of the disclosure, the return line further comprises a recirculation inlet port.

In some implementations of the fourth aspect of the disclosure, the hot water circulation system further comprises a thermal bypass valve fluidically connected to the hot water pipe outlet and fluidically connected to the cold-water supply port.

In some implementations of the fourth aspect of the disclosure, the thermal bypass valve is fluidically connected between a hot water supply and a cold-water supply of a plumbing fixture.

In some implementations of the fourth aspect of the disclosure, the thermal bypass valve comprises a heat activated seal.

In some implementations of the fourth aspect of the disclosure, the heat engine is a tankless water heater.

A fifth aspect of the disclosure describes a method of circulating hot water through a system comprising pumping water from a cold-water source to a heat engine to produce hot water and circulating the hot water from the heat engine to a thermal bypass valve, where the thermal bypass valve is configured to close when hot water contacts a heat activated seal. The method of circulating hot water through a system comprises circulating the hot water from the heat engine through a bypass circuit to the cold-water source when the thermal bypass valve is closed. The method of circulating hot water through a system sensing a temperature of the water from the cold-water source entering the heat engine. The method of circulating hot water through a system comprises turning off a water pump once the temperature reaches a predetermined temperature.

In some implementations of the fifth aspect of the disclosure, the method of circulating hot water through a system further comprises sensing that the temperature of the water has fallen below the predetermined temperature and turning on the water pump.

In some implementations of the fifth aspect of the disclosure, the method of circulating hot water through a system further comprises relieving a pressure between the thermal bypass valve and the heat engine.

In some implementations of the fifth aspect of the disclosure, the method of circulating hot water through a system further comprises releasing a pressure between a thermal bypass valve and a plumbing fixture.

In some implementations of the fifth aspect of the disclosure, the method of circulating hot water through a system further comprises electronically actuating a solenoid valve configured to be open when the water pump is on and configured to be closed when the water pump is off.

In some implementations of the fifth aspect of the disclosure, the heat engine is a tankless water heater.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or in existence. Like numbers represent like parts throughout the various figures, the description of which is not repeated for each figure. The disclosure should in no way be limited to the illustrative implementations, drawings, and techniques illustrated below, but may be modified within the scope of the appended claims along with their full scope of equivalents. Use of the phrase "and/or" indicates that any one or any combination of a list of options can be used. For example, "A, B, and/or C" means "A", or "B", or "C", or "A and B", or "A and C", or "B and C", or "A and B and C".

A hot water bypass system comprises a water pump and a bypass circuit that connects to a cold-water supply line and provides the ability to recirculate water from a hot water heater outlet into a water heater inlet through the water pump. Such hot water bypass systems are particularly beneficial in situations where a dedicated hot water recirculation line is not present. In such situations, the hot water heater outlet may connect to a hot water line that terminates at a furthest fixture with a thermal bypass valve connected between the hot water line and a cold-water supply line. Upon circulating hot water to the thermal bypass valve, a temperature sensitive seal may close, forcing hot water to circulate through the bypass circuit. A temperature sensor may detect the temperature of the water heater inlet for detecting when the hot water is received from the bypass circuit. The temperature senor may electronically communicate with a processor to turn off power to the water pump upon the temperature at the water heater inlet reaching a predetermined temperature.

In some implementations, the cold-water supply line may also include a recirculation port for systems that have a dedicated hot water recirculation line. Upon the hot water being received from the recirculation port and provided to the water heater inlet, the temperature sensor detects the temperature of the recirculated hot water and the processor turns off the water pump. By turning off the water pump when the temperature sensor senses the predetermined temperature, the hot water bypass system avoids pumping more hot water than needed to charge the hot water line with hot water. In embodiments, a hot water temperature sensor may sense that the temperature in the hot water line has dropped to a predetermined temperature, wherein the processor may re-activate the water pump. The water pump may also be triggered to start based on a user instruction (e.g., wireless command or button on the pump) or on a periodic or scheduled basis.

Figure 1:
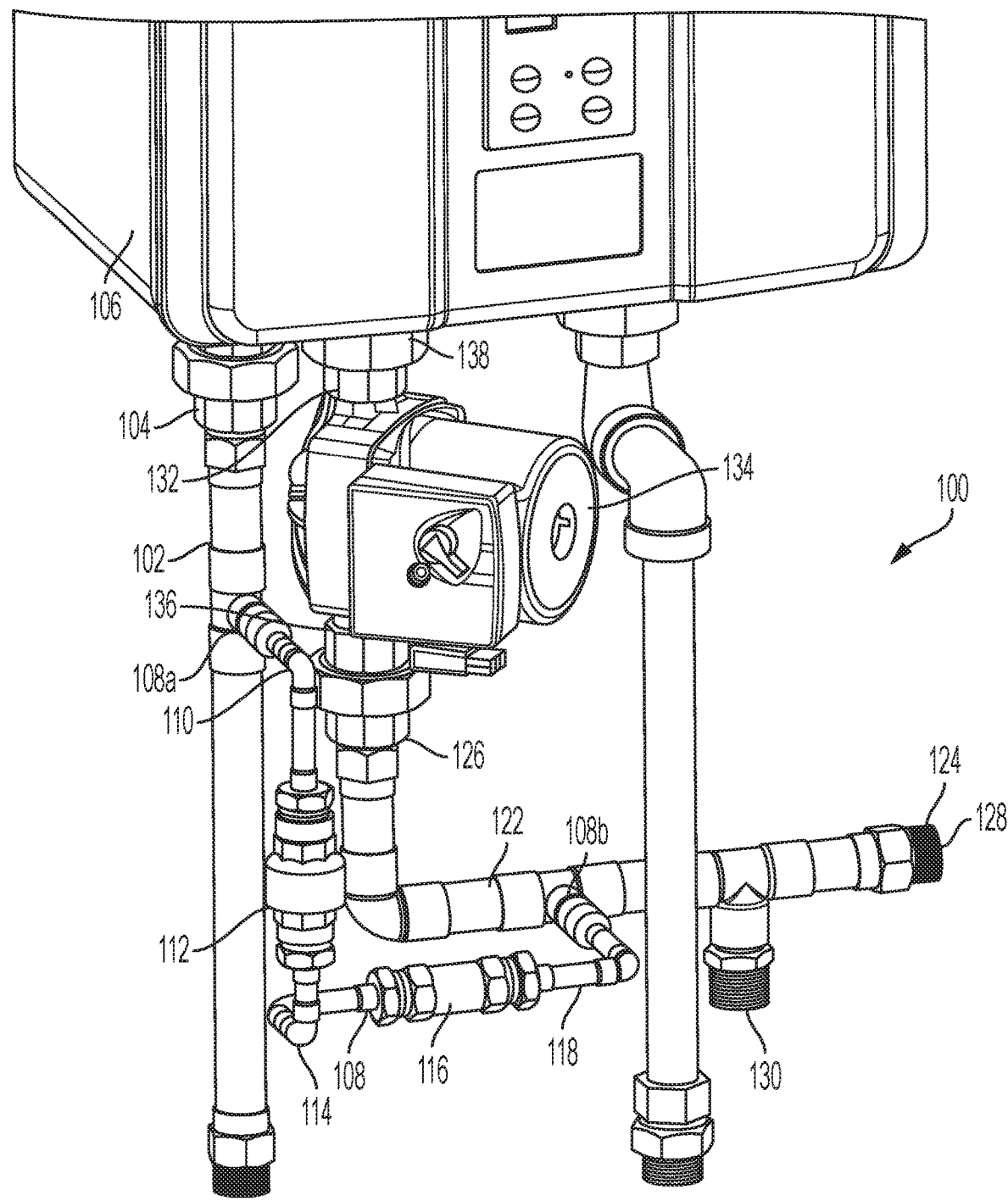
FIG. 1 illustrates a perspective view of a hot water bypass system.

FIG. 1 illustrates a hot water bypass system 100 having a primary hot water pipe 102 which is fluidically connected to a hot water outlet 104 of a heat engine 106. In various implementations, the heat engine 106 is a tankless water heater or other type of water heater. The hot water bypass system 100 may also have a bypass circuit 108. In embodiments, the bypass circuit 108 has an inlet 108a, and an outlet 108b. In embodiments, the bypass circuit 108 also has a bypass entry tube 110 which is fluidically connected to the primary hot water pipe 102. The bypass entry tube 110 fluidly connects to a check valve 112. The check valve is also fluidically connected to an intermediate tube 114. The check valve may be configured to regulate the flow of water and ensure unidirectional fluid flow through the bypass circuit 108 from the inlet 108a to the outlet 108b. The intermediate tube 114 is also fluidically connected to a flow restrictor 116. The flow restrictor 116 may be configured to regulate the fluid pressure within the bypass circuit 108 to ensure that the pressure drop across the bypass circuit 108 is maintained within a predetermined range. The flow restrictor 116 may fluidically connect to a bypass circuit exit tube 118.

The bypass circuit exit tube 118 terminates with the bypass circuit outlet 108b, where the bypass circuit outlet 108b is fluidically connected to a cold-water supply line 122. The cold-water supply line 122 has a first end 124 and a second end 126. In embodiments the cold-water supply line 122 may have a recirculation inlet port 128 at the first end 124. The recirculation inlet port 128 may be configured to receive water from a hot water recirculation line, when one is present, to recirculate hot water with the heat engine 106. In some implementations, the recirculation inlet port 128 may be capped or not present when there is no hot water recirculation line at an installation location.

Additionally, the cold-water supply line 122 may have a cold-water supply port 130 which may be fluidically connected to the cold-water supply line 122 at a point between the first end 124 and the bypass circuit outlet 108b. The second end 126 of the cold-water supply line 122 may be fluidically connected to a water pump 134 at a water pump inlet 136. Accordingly, the bypass circuit 108 connects to the cold-water supply line 122 between the cold-water supply port 130 and the water pump 134. The water pump 134 may also have an outlet 132 that is fluidically connected to a cold-water inlet 138 on the heat engine 106. Therefore, the bypass circuit 108 is fluidically coupled between the hot water outlet 104 and the cold-water inlet 138 of the heat engine 106 via the water pump 134.

The pressure drop across the bypass circuit 108 in a direction from the cold-water supply line 122 to the primary hot water pipe 102 is less than a pressure drop across the heat engine 106 (e.g., from the cold-water inlet 138 to the hot water outlet 104). With the check valve 112, the pressure drop across the bypass circuit 108 in a direction from the cold-water supply line 122 to the primary hot water pipe 102 may be effectively zero. The pressure drop across the bypass circuit 108 in a direction from the primary hot water pipe 102 to the cold-water supply line 122 is less than a pressure drop from the hot water pipe 102 to a furthest fixture connected to the hot water pipe 102.

In operation, while the water pump 134 circulates water from the cold-water supply line 122 through the heat engine 106 and out of the hot water outlet 104 to the primary hot water pipe 102. Under normal operating conditions, the pressure drop across the bypass circuit 108 in a direction from the primary hot water pipe 102 to the cold-water supply line 122 is less than a pressure drop from the hot water pipe 102 to a furthest fixture connected to the hot water pipe 102. Accordingly, the hot water supplied form the hot water outlet 104 will flow through the hot water pipe 102 towards the furthest fixture and will not flow through the bypass circuit 108. Upon development of a backpressure in the primary hot water pipe 102, such as upon activation of a thermal bypass valve as described in more detail below, the pressure drop from the hot water pipe 102 to the furthest fixture will be less than the pressure drop across the bypass circuit 108 and hot water will begin to flow through the bypass circuit 108. The hot water flowing through the bypass circuit 108 to the cold-water supply line 122 is pumped by the water pump 134 to the cold-water inlet 138 of the heat engine 106. The heat engine 106 may detect an increase in a temperature of water being supplied to the cold-water inlet 138, such as through an inlet water temperature sensor (not shown), and instruct the water pump 134 to stop pumping water.

Figure 2:
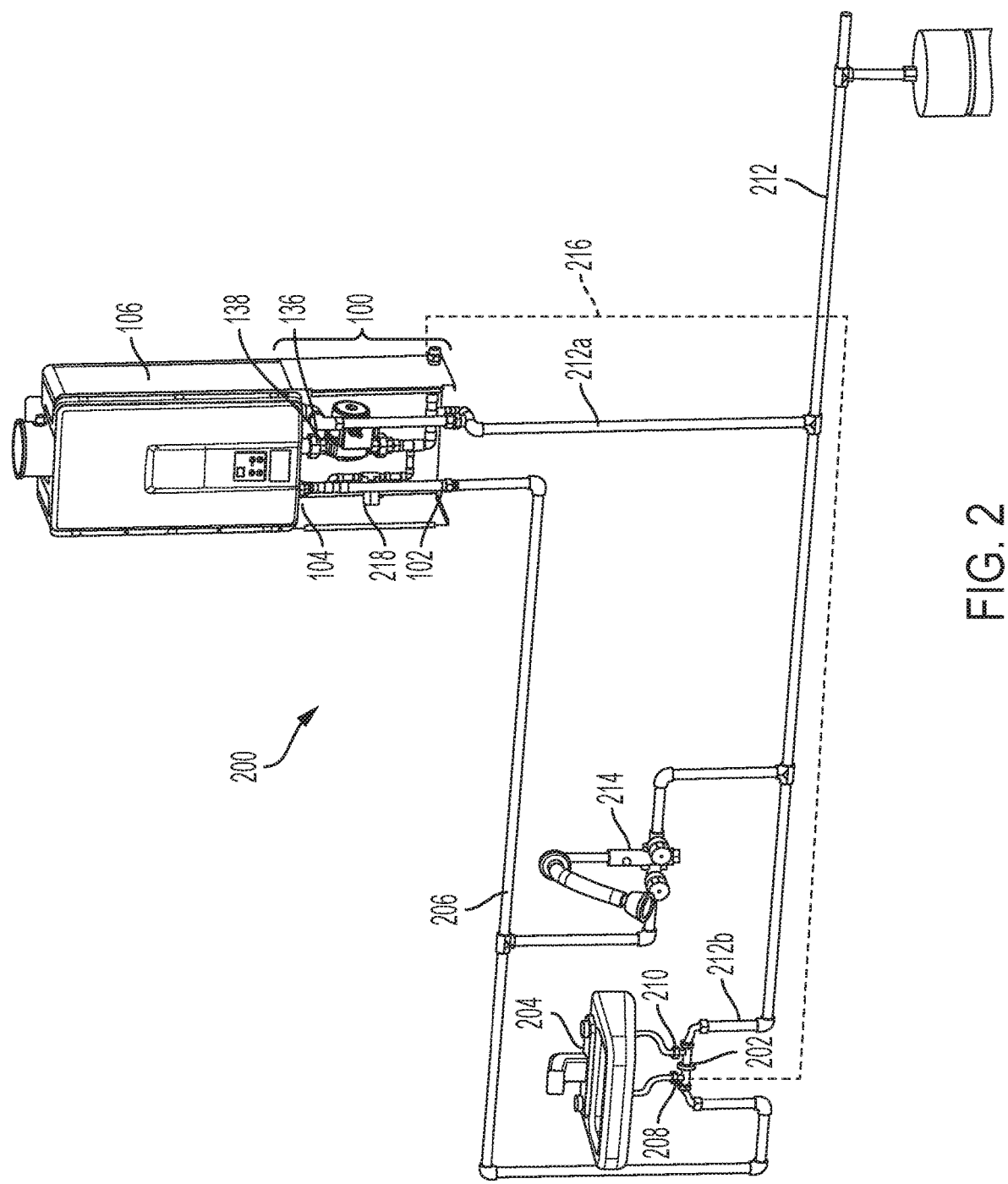
FIG. 2 illustrates a hot water circulation system.

FIG. 2 illustrates a hot water circulation system 200, that incorporates the heat engine 106 having the cold-water inlet 138 and the hot water outlet 104 that is fluidically connected to the primary hot water pipe 102 as illustrated in FIG. 1. The cold-water inlet 138 is fluidically connected to the hot water bypass system 100 as illustrated in FIG. 1 such that the cold-water inlet 138 is connected to the water pump outlet 136. Additionally, FIG. 2 illustrates the hot water outlet 104 being fluidically connected via the primary hot water pipe 102 to a thermal bypass valve 202, which may be a GRUNDFOS COMFORT valve or some other form of thermal bypass valve. The thermal bypass valve 202 may comprise a thermally reactive material, such as a thermal plastic, which may create a heat activated seal. The thermal bypass valve 202 may be situated at a furthest fixture 204 on a hot water supply line 206 between a hot water supply 208 of the fixture 204 and a cold-water supply 210 of the fixture 204. A cold-water supply 212, such as a municipal water supply, supplies cold water to the cold-water supply port 130 via a first cold-water supply line 212a and supplies cold water to the cold-water supply 210 of the fixture 204 via a second cold-water supply line 212b.

One or more additional fixtures 214 may have hot and cold water supplies coupled to the hot water supply line 206 and the cold-water supply line 212b, respectively. The plumbing fixtures 204, 214 may serve as outlets for hot water and provide a pressure drop when a corresponding hot water valve on the fixtures 204, 214 is open in the hot water circulation system 200.

In other embodiments, a dedicated water recirculation line 216, may fluidically connect the hot water supply 208 of the furthest fixture 204 to the recirculation inlet port 128, as shown in FIG. 2 with a dotted line. In this embodiment, the thermal bypass valve 202 may not be used, and a t-joint pipe may fluidically connect the hot water supply line 206, one of the plumping fixtures 204 and the dedicated water recirculation line 216.

An additional water source, such as cooled water from a hot water storage tank, may also be directed to the recirculation inlet port 128 in parallel with the cold-water supply 204. The primary hot water pipe 102 may be fluidly connected to a hot water storage tank (not shown) at a storage tank inlet. The hot water storage tank may also have an outlet, where the hot water storage tank outlet is fluidically connected to the hot water supply line 206. Additionally, the hot water storage tank may have a recirculation outlet. The hot water storage tank recirculation outlet may be fluidically connected to the dedicated water recirculation line 216.

Figure 3:
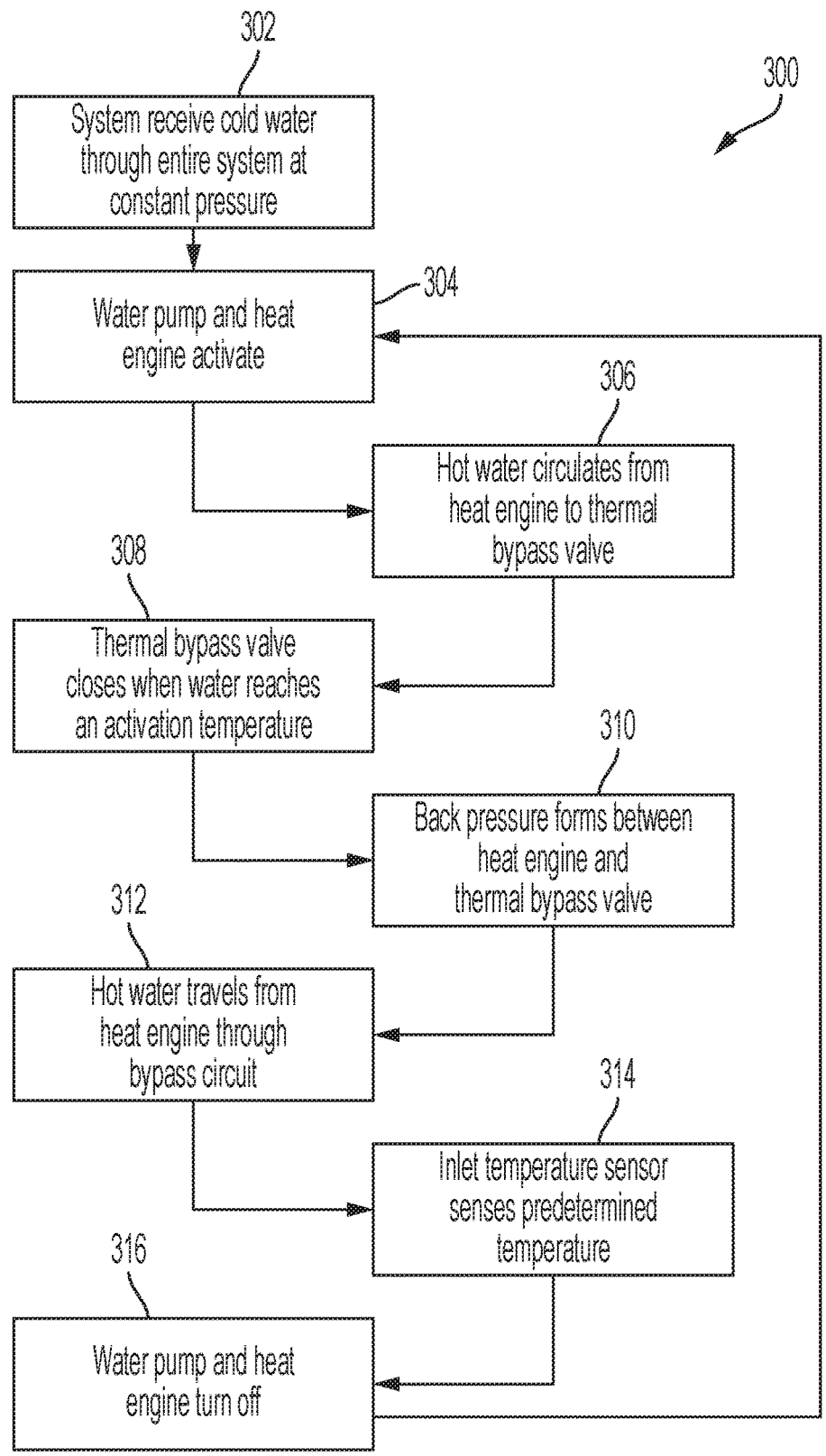
FIG. 3 illustrates a hot water circulation system flow chart.

FIG. 3 illustrates a flow diagram 300 showing a process flow for the hot water circulation system 200 as illustrated in FIG. 2. At 302, the hot water circulation system 200 may receive cold water from a cold-water supply 204 throughout the hot water circulation system 200. In an initial state, cold-water may enter the hot water circulation system 200 until the water fills the hot water circulation system and exists at a constant pressure within the hot water circulation system 200.

At 304, the water pump 134 and heat engine 106 may be activated to initiate hot water recirculation. The water pump 134 may be activated using manual (e.g., a button on the water pump 134 or the heat engine 106) or remote input (e.g., an application on a smartphone in communication with the heat engine) to start recirculation. In some implementations, the water pump 134 may be activated based on a predefined schedule (e.g., set times to initiate hot water recirculation or learned behaviors for when hot water may be desired).

At 306, water may circulate through the heat engine 106. As the water circulates through the heat engine 106, the water may obtain heat from the heat engine 106 through convection or some other means of heat transfer such as conduction or radiation. Once water is heated within the heat engine 106, the water may exit the hot water outlet 104 and flow through the primary hot water pipe 102. The water may exit the primary hot water pipe 102, travel through a hot water supply line 206, and contact the thermal bypass valve 202.

When under a predetermined temperature, the water passes through the thermal bypass valve 202, travels up the second cold-water supply line 212b to the first cold-water supply line 212a and circulates to the water pump 134. At 308, when the water at the thermal bypass valve 202 reaches the predetermined temperature, the thermal bypass valve 202 may close. At 310, upon the thermal bypass valve 202 closing, a backpressure will form between the thermal bypass valve 202 and the heat engine 106 because the water pump 134 is pumping water through the heat engine 106 and through the primary hot water pipe 102.

At 312, the backpressure formed by the thermal bypass valve 202 closing may raise a pressure such that a pressure drop across the primary hot water pipe 102 is less than the pressure drop across the bypass circuit 108 and hot water will begin to flow through the bypass circuit 108. In this state, the pressure drop from the primary hot water pipe 102 to the furthest fixture 204 is called a capacity pressure drop.

Generally, the capacity pressure drop is a pressure drop of nearly zero, between the heat engine hot water outlet 104 and the thermal bypass valve 202. Additionally, the pressure drop between the cold-water supply port 130 and the water pump 134 is called the cold-water entry pressure drop. In embodiments, the pressure drop across the bypass circuit 108 is less than the cold-water entry pressure drop, at all times, ensuring that hot water does not enter the cold-water supply port 130 under normal conditions (e.g., until the thermal bypass valve 202 closes). The pressure drop across the heat engine 106 is also greater than the pressure drop across the bypass circuit 108 to prevent cold water from flowing through the bypass circuit 108 to the primary hot water pipe 102. Additionally, the check valve 112 in the bypass circuit 108 prevents cold water from flowing through the bypass circuit 108 to the primary hot water pipe 102.

At 314, an inlet temperature sensor (not shown) senses a predetermined temperature. The inlet temperature sensor may be situated in a flow path from the cold-water inlet 138 of the heat engine 106. In some implementations, the inlet temperature sensor may be situated at an inlet of the water pump 134. Because the inlet temperature sensor normally senses the temperature of cold water received through the cold-water inlet 138, upon hot water flowing through the bypass circuit 108, the inlet temperature sensor senses an increased temperature of the hot water. The predetermined temperature may be a set point temperature or a temperature within a predefined range of the set point temperature (e.g., within five or ten degrees of the set point temperature). Alternatively, the predetermined temperature may be a temperature greater than a threshold temperature (e.g., greater than 60, 70, 80, 90, or 100 degrees). Other predetermined temperatures are contemplated by this disclosure, such as a time averaged increase over a predetermined threshold or other such ways of quantifying an increase in the temperature sensed by the inlet temperature sensor (e.g., the temperature increased by 20 degrees).

At 316, in response to the inlet temperature sensor sensing the predetermined temperature, the water pump 134 and/or the heat engine 106 is turned off. In some implementations, turning off the water pump 134 causes the heat engine 106 to turn off due to a flow rate of water running through the heat engine 106 going below a predetermined flow rate.

While the bypass circuit 108 is described above with the check valve 112 and flow restrictor 116, in some implementations, the bypass circuit 108 may have a solenoid valve (not shown). When there is a capacity pressure drop, the pressure drop across the heat engine 106 is greater than the pressure drop across the solenoid valve. The pressure drop across the solenoid valve is also less than the cold-water entry pressure drop at all times. Additionally, the solenoid valve may be electronically activated to allow water from the primary hot water pipe 102 to flow through the solenoid valve. The solenoid valve may also be electronically deactivated to keep water from the primary hot water pipe from flowing through the solenoid valve. In embodiments, the solenoid valve may be electronically activated when a timer reaches a preset time, prompting the solenoid valve to open. The solenoid valve may also open when the water pump is activated 134 and closed when the water pump 134 is deactivated.

In some embodiments where the bypass circuit 108 has a solenoid valve 218, a water heater control system may control the solenoid valve 218 such that the solenoid valve 218 opens when a first water temperature is sensed by a recirculation temperature sensor and closes when the temperature sensor senses a second water temperature. The recirculation temperature sensor may be located at the furthest fixture 204. The first water temperature is a predetermined amount less than a set point temperature (e.g., ten degrees below the set point temperature). The second water temperature is at or about (e.g., within two degrees) the set point temperature. In embodiments, the recirculation temperature sensor may be adjacent to the thermal bypass valve 202, such that the water temperature that the recirculation temperature sensor senses is roughly the temperature of the water that contacts the thermal bypass valve 202. In some embodiments, the water pump 134 may start when the recirculation temperature sensor senses the first water temperature.

Figure 4:
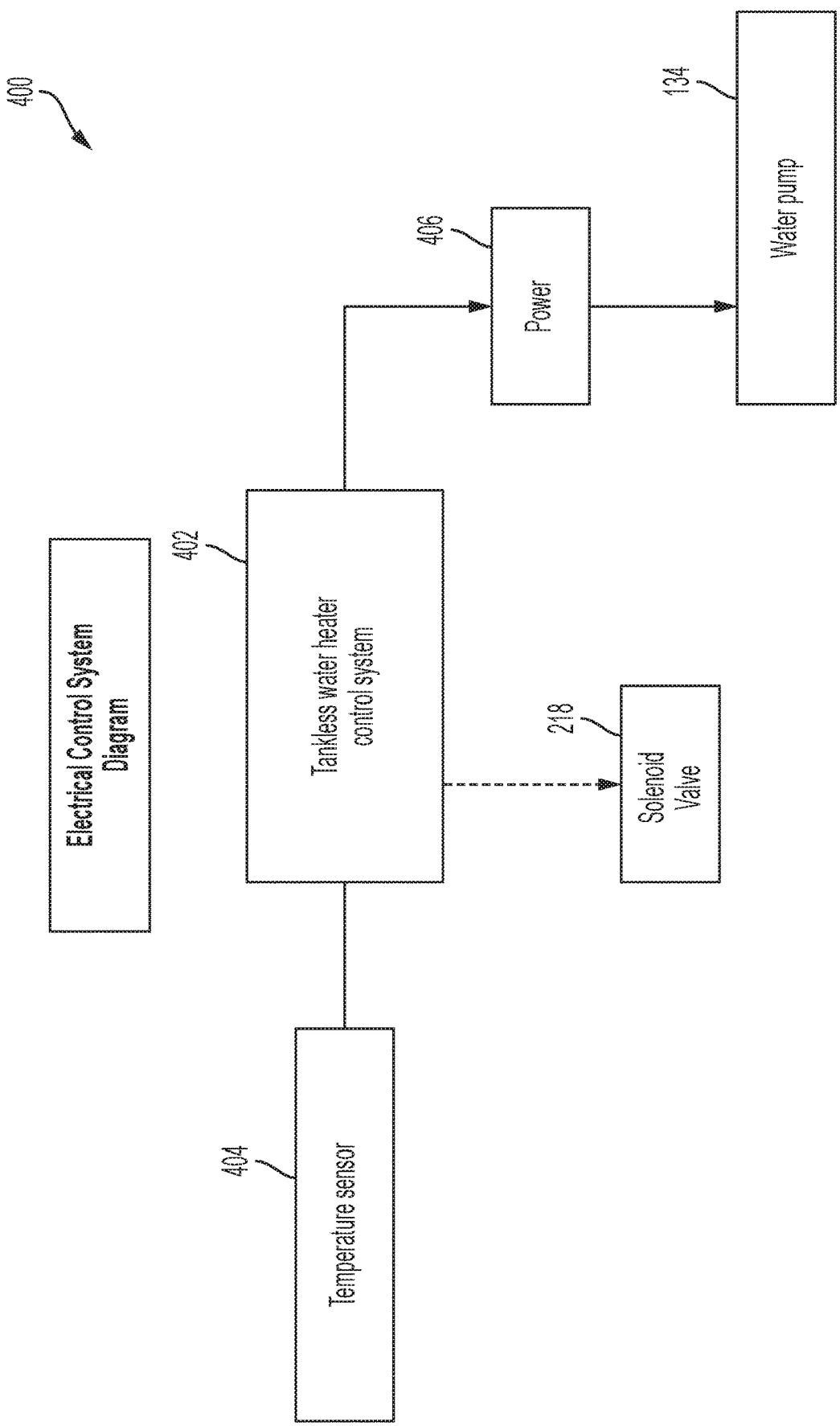
FIG. 4 illustrates an electrical control system diagram for a hot water circulation system.

FIG. 4 illustrates a block diagram of the hot water bypass system electrical control system 400. Briefly, the hot water bypass system electrical control system 400 may include a tankless water heater control system 402. The tankless water heater control system 402 may be configured to control the functions of the heat engine 106 to produce hot water, in addition to the functions described herein. The electrical control system 400 may also include a temperature sensor 404 that may be situated within a flow path from the cold-water inlet 138 of the heat engine 106. FIG. 4 also illustrates a power source 406 that is selectively activated or deactivated to start or stop the water pump 134. The power source 406 may be integrated within the tankless water heater control system 402 or provided by an external power supply. The tankless water heater control system 402 may control the power source 406, such that the power source 406 supplies power to the water pump 134 as directed by the water heater control system 402. For example, the power source 406 may supply power to the water pump 134 at a predetermined time or upon receiving an activation signal (e.g., user input) to activate the water pump 134 and produce a water flow in the hot water circulation system 200. The power source 406 may shut off power to the water pump 134 when the temperature sensor 404 senses a predetermined temperature, such as described above at 314.

In embodiments, a solenoid valve 218 may function as an electronically actuated bypass circuit 108 that is controlled by the tankless water heater control system 402. The water heater control system 402 may open the solenoid valve 218 when the water pump 134 is powered. Likewise, the water heater control system 402 may close the solenoid valve 218 when the water pump 134 is turned off.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A hot water circulation system comprising:
a tankless water heater having a cold-water inlet and a hot water outlet;
a temperature sensor positioned proximate to the cold-water inlet of the tankless water heater and configured to sense a temperature of water flowing in the cold-water inlet of the tankless water heater;
a hot water supply line fluidically connected to the hot water outlet of the tankless water heater;
a water pump comprising a water pump inlet and a water pump outlet, wherein the water pump outlet is fluidically coupled to the cold-water inlet of the tankless water heater;
a bypass circuit coupled between the hot water outlet and the cold water inlet of the tankless water heater, the bypass circuit comprising a water flow control unit, wherein the water flow control unit is configured to permit a flow of water from the hot water outlet to the cold water inlet in response to an increase in pressure on the hot water supply line caused by the water pump;
a cold-water supply line fluidically coupled to the water pump inlet and comprising a cold-water supply port, wherein the bypass circuit is fluidically coupled to the cold-water supply line and the hot water supply line; and
a controller configured to stop the water pump upon the temperature sensor detecting a predetermined temperature.

2. The system of claim 1, further comprising:
a thermal bypass valve fluidically connected to the hot water supply line and the cold-water supply port.

3. The system of claim 2, wherein a first pressure drop across the bypass circuit from the hot water supply line to the cold-water supply line is less than a second pressure drop from the hot water supply line to the thermal bypass valve when the thermal bypass valve is open to prevent circulating hot water from the hot water supply line to the cold-water supply line when the thermal bypass valve is open.

4. The system of claim 3, wherein the first pressure drop across the bypass circuit from the hot water supply line to the cold-water supply line is greater than a third pressure drop from the hot water supply line to the thermal bypass valve when the thermal bypass valve is closed to promote circulating hot water from the hot water supply line to the cold-water supply line when the thermal bypass valve is closed.

5. The system of claim 4, wherein a fourth pressure drop across the bypass circuit from the cold-water supply line to the hot water supply line is less than a fifth pressure drop from the cold-water inlet to the hot water outlet of the tankless water heater to prevent cold water from circulating from the cold-water supply line to the hot water supply line.

6. The system of claim 4, wherein the water flow control unit of the bypass circuit comprises:
a check valve; and
a flow restrictor.

7. The system of claim 4, wherein the water flow control unit of the bypass circuit comprises:
a solenoid valve configured to be open when the water pump is on and configured to be closed when the water pump is off.

8. The system of claim 4, wherein the water flow control unit of the bypass circuit comprises a pipe with a diameter configured to provide the first pressure drop.

9. The system of claim 1, wherein the predetermined temperature is a set point of the tankless water heater, a predefined range within the set point temperature, or an increase in the temperature of water flowing in the cold-water inlet of the tankless water heater by a predetermined amount.

10. The system of claim 9, wherein the temperature sensor is located in a flow path of the tankless water heater from the cold-water inlet, at the water pump inlet, or at the water pump outlet.

11. The system of claim 1, wherein the controller is configured to start the water pump in response to a user instruction or on a periodic or scheduled basis.

12. A method of circulating hot water through a system comprising:
pumping, by a water pump, water through a cold-water inlet of a tankless water heater to produce hot water;
circulating the hot water from a hot water outlet of the tankless water heater to a thermal bypass valve via a hot water supply line, where the thermal bypass valve is configured to close when hot water contacts a heat activated seal;
circulating the hot water from the hot water outlet of the tankless water heater through a bypass circuit to the cold-water inlet when the thermal bypass valve is closed, wherein the bypass circuit comprises a water flow control unit configured to permit a flow of water from the hot water outlet to the cold water inlet in response to an increase in pressure on the hot water supply line caused by pumping water by the water pump while the thermal bypass valve is closed;
sensing a temperature of the water entering the tankless water heater from the cold-water inlet;
turning off the water pump once the temperature reaches a predetermined temperature.

13. The method of claim 12, wherein the bypass circuit is coupled between the hot water supply line fluidically connected to the hot water outlet of the tankless water heater and a cold-water supply line fluidically connected to the cold-water inlet of the tankless water heater.

14. The method of claim 13, wherein the cold-water supply line comprises a cold-water supply port, and wherein the thermal bypass valve is connected to the hot water supply line and the cold-water supply port.

15. The method of claim 13, wherein a first pressure drop across the bypass circuit from the hot water supply line to the cold-water supply line is less than a second pressure drop from the hot water supply line to the thermal bypass valve when the thermal bypass valve is open to prevent circulating hot water from the hot water supply line to the cold-water supply line when the thermal bypass valve is open.

16. The method of claim 15, wherein the first pressure drop across the bypass circuit from the hot water supply line to the cold-water supply line is greater than a third pressure drop from the hot water supply line to the thermal bypass valve when the thermal bypass valve is closed to promote circulating hot water from the hot water supply line to the cold-water supply line when the thermal bypass valve is closed.

17. The method of claim 16, wherein a fourth pressure drop across the bypass circuit from the cold-water supply line to the hot water supply line is less than a fifth pressure drop from the cold-water inlet to the hot water outlet of the tankless water heater to prevent cold water from circulating from the cold-water supply line to the hot water supply line.

18. The method of claim 16, wherein the bypass circuit comprises a water flow control unit selected from the group consisting of: a check valve and flow restrictor; a solenoid valve configured to be open when the water pump is on and configured to be closed when the water pump is off; and a pipe with a diameter configured to provide the first pressure drop.

19. The method of claim 16, wherein the predetermined temperature is a set point of the tankless water heater, a predefined range within the set point temperature, or an increase in the temperature of water flowing in the cold-water inlet of the tankless water heater by a predetermined amount.

20. The method of claim 12, wherein the water pump starts pumping water through the cold-water inlet of the tankless water heater in response to a user instruction or on a periodic or scheduled basis.

\* \* \* \* \*